United States Patent
Kyung et al.

(10) Patent No.: US 11,854,323 B2
(45) Date of Patent: *Dec. 26, 2023

(54) ACCESS CONTROL METHOD BASED ON RECEIVED SIGNAL STRENGTH INDICATOR

(71) Applicant: MOCA SYSTEM INC., Seongnam-si (KR)

(72) Inventors: Jae Hyun Kyung, Seongnam-si (KR); Jong Keun Lee, Seongnam-si (KR)

(73) Assignee: MOCA SYSTEM INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/878,855

(22) Filed: Aug. 1, 2022

(65) Prior Publication Data

US 2022/0383679 A1    Dec. 1, 2022

Related U.S. Application Data

(63) Continuation of application No. 17/362,229, filed on Jun. 29, 2021, now Pat. No. 11,430,275.

(30) Foreign Application Priority Data

Dec. 18, 2020    (KR) .................. 10-2020-0178628

(51) Int. Cl.
| | | |
|---|---|---|
| *G07C 9/00* | (2020.01) | |
| *H04B 17/318* | (2015.01) | |
| *H04W 12/06* | (2021.01) | |
| *G07C 9/22* | (2020.01) | |
| *H04W 4/02* | (2018.01) | |

(52) U.S. Cl.
CPC ............ *G07C 9/00309* (2013.01); *G07C 9/22* (2020.01); *H04B 17/318* (2015.01); *H04W 4/023* (2013.01); *H04W 12/06* (2013.01); *G07C 2009/00769* (2013.01)

(58) Field of Classification Search
None
See application file for complete search history.

(56) References Cited

U.S. PATENT DOCUMENTS

| | | | | |
|---|---|---|---|---|
| 9,483,887 | B1 * | 11/2016 | Soleimani | .......... G07C 9/00309 |
| 10,887,026 | B1 * | 1/2021 | Tsai | .................... H04B 17/318 |
| 2014/0077929 | A1 | 3/2014 | Dumas et al. | |

FOREIGN PATENT DOCUMENTS

JP    2017-146732 A    8/2017

OTHER PUBLICATIONS

Japanese Office Action issued in corresponding application No. 2021-0126101, dated Sep. 20, 2023.

* cited by examiner

*Primary Examiner* — Adolf Dsouza
(74) *Attorney, Agent, or Firm* — Maschoff Brennan

(57) ABSTRACT

A method of controlling access of a user terminal comprising: acquiring a received signal strength indicator (RSSI) of a signal received from an access control device; acquiring a first distance variable based on the RSSI, the first distance variable being related to a distance between the user terminal and the access control device; acquiring a second distance variable based on the first distance variable; and transmitting a signal for providing authentication information of the user terminal to the access control device.

17 Claims, 12 Drawing Sheets

ACCESS CONTROL METHOD BASED ON RECEIVED SIGNAL STRENGTH INDICATOR

CROSS-REFERENCE TO RELATED APPLICATION

This application is a continuation of U.S. patent application Ser. No. 17/362,229 filed Jun. 29, 2021, and claims priority to and the benefit of Korean Patent Application No. 10-2020-0178628, filed on Dec. 18, 2020, the disclosure of which is incorporated herein by reference in its entirety.

BACKGROUND

1. Field of the Invention

The present invention relates to a received signal strength indicator (RSSI)-based access control method.

2. Discussion of Related Art

One technical implementation for controlling access to a building or specific area employs a technology of an access control device for acquiring information stored in advance in a user terminal, determining whether the acquired information matches the stored information, and controlling access.

In the technology, the user terminal was conventionally implemented as a card key or the like but, in recent years, has become broadly implemented as a mobile terminal such as a smartphone carried by a user.

A received signal strength indicator (RSSI) refers to the energy level of a specific frequency band of a received signal and may be used to determine the distance between a device for receiving a signal and a device for transmitting a signal.

SUMMARY OF THE INVENTION

The present invention is directed to providing an access control method capable of acquiring information about the distance between a user terminal and an access control device based on received signal strength indicators (RSSIs) acquired by the user terminal in advance for a predetermined time.

The present invention is directed to providing an access control method that is robust against noise by acquiring information about the distance between a user terminal and an access control device based on RSSIs acquired by the user terminal in advance for a predetermined time and removing noise from the acquired information about the distance.

The technical objectives of the present invention are not limited to the above, and other objectives may become apparent to those of ordinary skill in the art based on the following description.

The technical solutions of the present invention are not limited to the above, and other solutions may become apparent to those of ordinary skill in the art based on the following description.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
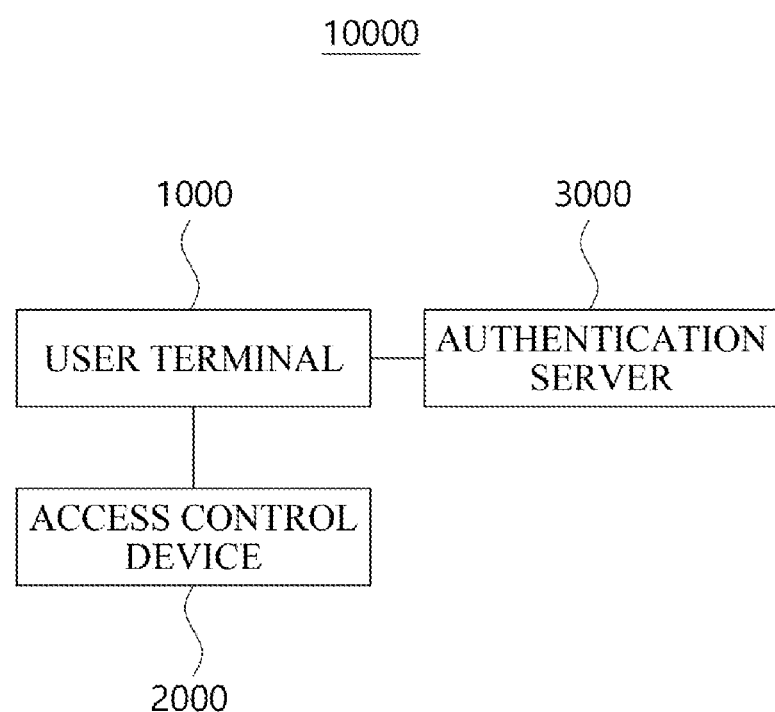
FIG. 1 is a diagram illustrating an access control system according to an embodiment.

Embodiments described in this specification are made to clearly explain the scope of the present invention to those having ordinary skill in the art and are not intended to limit the present invention. It should be interpreted that the present invention may include substitutions and modifications within the technical scope of the present invention.

Terms used herein have been selected as general terms which are widely used at the present in consideration of the functions of the present invention but may be altered according to the intent of an operator of ordinary skill in the art, conventional practice, or the introduction of new technology. However, when a specified term is defined and used in an arbitrary sense, a meaning of the term will be described separately. Accordingly, the terms used herein are not to be defined as simple names of the components but should be defined based on the actual meaning of the terms and the whole context throughout the present specification.

The accompanying drawings are for facilitating the explanation of the present invention and a shape in the drawings may be exaggerated for the purpose of convenience of explanation, thus the present invention is not to be limited to the drawings.

In addition, details of generally known functions and structures which obscure the subject matter of the present invention will be omitted as required.

According to an embodiment, a method of controlling access of a user terminal, comprises acquiring a received signal strength indicator (RSSI) of a signal received from an access control device; acquiring a first distance variable based on the RSSI, wherein the first distance variable being related to a distance between the user terminal and the access control device; acquiring a second distance variable based on the first distance variable; and transmitting a signal for providing authentication information of the user terminal to the access control device such that the access control device determines whether to allow access of the user terminal within a first predetermined time period including a time point when the first distance variable becomes less than or equal to a predetermined fixed reference value or within a second predetermined time period including a time point when the second distance variable becomes less than or equal to a variable reference value that is determined based on a rate of change of the first distance variable per unit time.

Wherein the first distance variable is acquired based on Equation below:

$$\text{first distance variable} = 10^{\{(A-RSSI)/B\}}, \qquad \text{[Equation]}$$

Wherein the A represents a corrected value of a maximum RSSI value acquired from the user terminal, wherein the B represents a sensitivity determination value for determining a sensitivity of measuring the distance between the user terminal and the access control device, and wherein the RSSI represents an RSSI value acquired from the user terminal.

Wherein the A is determined as a value obtained by adding a maximum value of the RSSI acquired from the user terminal to a preset offset value, the B is determined as a value obtained by subtracting the maximum value of the RSSI acquired from the user terminal from a preset reference value, and the A is greater than the preset reference value and smaller than the maximum value of the RSSI.

Wherein the second distance variable is a distance variable obtained based on a first average slope of the first distance variable obtained between a first time point and a second time point after the first time point and a second average slope of the first distance variable obtained between a third time point after the first time point and a fourth time point after the second time point.

Wherein the variable reference value is a reference value obtained based on a first average slope of the first distance variable obtained between a first time point and a second time point after the first time point and a second average slope of the first distance variable obtained between a third time point after the first time point and a fourth time point after the second time point.

Wherein the signal for providing the authentication information of the user terminal is transmitted to the access control device at the time point when the first distance variable becomes less than or equal to the fixed reference value or at the time point when the second distance variable becomes less than or equal to the variable reference value.

Wherein the method further comprises acquiring the second distance variable at a first time point that is earlier than the time point when the second distance variable becomes less than or equal to the variable reference value; acquiring an expected second distance variable based on a slope of the second distance variable; acquiring a second time point at which the expected second distance variable becomes less than or equal to the variable reference value; and transmitting the signal for providing the authentication information of the user terminal to the access control device when a difference between the first time point and the second time point is less than a predetermined time interval.

According to another embodiment, a user terminal comprises a communication unit configured to transmit and receive a signal to and from an access control device; and a controller configured to control the communication unit, wherein the controller transmits a signal for providing authentication information of the user terminal to the access control device such that the access control device determines whether to allow access of the user terminal within a first predetermined time period including a time point when a first distance variable becomes less than or equal to a predetermined fixed reference value or within a second predetermined time period including a time point when a second distance variable becomes less than or equal to a variable reference value that is determined based on a rate of change of the first distance variable per unit time.

In the present specification, a user terminal refers to a terminal of a user who desires to access a target area. For example, the user terminal may include various devices, such as a mobile device, a smart phone, a personal digital assistant (PDA), a wearable device, a tablet personal computer (PC), and the like.

In addition, in the present specification, an access control device refers to an apparatus that controls access to the target area and may be, for example, provided in the form of a terminal, a computing device, or a server. In addition, the access control device may be disposed around the target area or may be disposed at a distance far from the target area.

In one embodiment, a method of acquiring information (hereinafter, referred to as a distance variable) about the distance between the access control device and the terminal through a change in received signal strength indicator (RSSI) indicating the energy level at a specific frequency of a signal transmitted from the access control device to the user terminal and performing communication for performing an access authentication based on the acquired information about the distance may be provided.

In general, the magnitude of an RSSI may have a negative correlation with the distance between the access control device and the terminal. Accordingly, the greater the acquired RSSI value, the smaller the distance between the access control device and the user terminal. In addition, the greater the acquired RSSI value, the smaller the distance variable based on the RSSI.

The user terminal may transmit a communication signal for access authentication to the access control device when the distance between the user terminal and the access control device becomes less than or equal to a reference distance. As an example, the user terminal may perform an operation of access authentication when a distance variable acquired based on a change in the magnitude of the RSSI of a signal received from the access control device becomes less than or equal to a reference value. For example, the user terminal may transmit a communication signal for access authentication to the access control device when the distance variable becomes less than or equal to the reference value.

In one embodiment, the distance variable based on the RSSI may follow Equation 1 below.

$$\text{Distance variable} = 10^{\frac{(TXPWR-RSSI)}{10}} \qquad \text{[Equation 1]}$$

In Equation 1, the distance variable may be an indicator having a positive correlation with the distance between the access control device and the user terminal. Therefore, decreasing the distance variable may represent decreasing distance between the access control device and the user terminal.

In Equation 1, TXPWR may refer to a value of the RSSI acquired from the user terminal when the distance between the access control device and the user terminal is 1 m.

In Equation 1, an RSSI may refer to a value of an RSSI acquired from the user terminal at one point in time.

However, depending on the type and/or model of the user terminal, the RSSI values may be different between the user terminals. For example, when a first user terminal and a second user terminal have different types or models and have the same distance to the access control device, the magnitude of the RSSI acquired by the access control device from the first user terminal may be different from the magnitude of the RSSI acquired by the access control device from the second user terminal. Accordingly, a distance at which the first user terminal transmits a communication signal to the access control device may be different from a distance at which the second user terminal transmits a communication signal to the access control device.

To this end, in the present specification, an access control method that is robust against a difference in type and/or model of a user terminal may be provided.

In addition, the present specification aims to provide a second distance variable that enables the user terminal to perform an operation of access authentication when the distance to the access control device becomes less than or equal to a reference distance regardless of noise included in the acquired RSSI. The second distance variable may be determined based on the first distance variable.

In addition, for the sake of convenience of description, the present specification is described in relation to the user terminal for acquiring an RSSI and, based on the acquired RSSI, acquiring the first distance variable and the second distance variable, but the present invention is not limited thereto. The description of the present specification may apply to the access control device or another apparatus. For example, the access control device or another apparatus may acquire an RSSI and, based on the acquired RSSI, may acquire the first distance variable and the second distance variable.

FIG. 1 is a diagram illustrating an access control system according to an embodiment.

Referring to FIG. 1, an access control system 10000 according to the embodiment may include a user terminal 1000, an access control device 2000, and an authentication server 3000.

In the present specification, the access control may refer to, when the user terminal 1000 is located within a predetermined area, controlling access to a security area based on information related to the user terminal 1000. In addition, the agent of performing access control may be the user terminal 1000 or the access control device 2000.

For example, in a case in which the access control refers to control for entering/leaving through a door, an access control operation may be performed based on information related to the user terminal when the user terminal 1000 is located in an area around the door.

For another example, in a case in which the access control refers to control for entering/leaving a security area, whether to perform an operation related to security in the security area may be determined based on information related to the user terminal 1000 when the user terminal 1000 is located in the security area.

The user terminal 1000 may include unique authentication information used for the access control operation. The user terminal 1000 may provide the unique authentication information used for the access control. Authentication information of the user terminal 1000 may be stored in advance in the access control device 2000 or the authentication server 3000.

The user terminal 1000 may transmit or receive a communication signal including information required for access control (e.g., a communication signal including authentication information for access authentication) to or from the access control device 2000. In addition, the user terminal 1000 may be connected to the access control device 2000 or the authentication server 3000 in a wired or wireless manner.

In addition, based on a change in the RSSI of the signal acquired by the user terminal 1000, the user terminal 1000 may provide a communication signal including information required for the access control to the access control device 2000 or the authentication server 3000. In addition, the user terminal 1000 may transmit a communication signal to the access control device 2000.

According to an embodiment, the access control device 2000 may be connected to the user terminal 1000. In the present specification, a connection may refer to a physical connection or a communicative or electrical connection between devices. In addition, connection may refer to direct connection or indirect connection between devices (e.g., connection between devices via another object or another device).

In one embodiment, a communication connection procedure may be established between the user terminal 1000 and the access control device 2000, and after the communication connection procedure is established, the user terminal 1000 and the access control device 2000 may communicate with each other.

In addition, the user terminal 1000 may transmit authentication information to the access control device 2000. In addition, the user terminal 1000 may request the access control device 2000 to perform an access control operation.

In addition, the access control device 2000 may acquire the authentication information from the user terminal 1000 and may determine validity based on the acquired authentication information. In one embodiment, the authentication information may include identification information of the user terminal 1000, identification information of a user of the user terminal 1000, a password, encryption information, decryption information, access authority information of the user or the user terminal 100, a token, and other various pieces information required for access authentication.

In addition, as an example of validity determination, the access control device 2000 may determine whether the user or the user terminal 1000 is authorized to access a target area based on the acquired authentication information, and upon determination that the user or the user terminal 1000 is authorized to access a target area, may allow the user or the user terminal 1000 to access the target area. For example, when a door is installed in the target area, the access control device 2000 may allow access to the target area by controlling a door opening/closing device configured to open or close the door. For another example, when the user or the user terminal 1000 is authorized to access the target area, the access control device 2000 may provide information indicating that the user or the user terminal 1000 is authorized to access the target area to the user terminal 1000. The user terminal 1000 may, in response to acquisition of the information indicating that the user or the user terminal 1000 is authorized to access the target area, transmit request information requesting the access control device 200 to allow access or request information requesting the door opening/closing device to open the door to the access control device 2000.

According to an embodiment, the authentication server 3000 may be connected to the user terminal 1000. In addition, the authentication server 3000 may be connected to the access control device 2000.

According to an embodiment, the authentication server 3000 may be connected to both the user terminal 1000 and the access control device 2000.

The authentication server 3000 may provide authentication information that is transmitted from the user terminal 1000 to the access control device 2000 to request the access control device 200 to perform an access control operation. For example, the authentication server 3000 may receive a request for requesting that authentication information should be issued to the user terminal 1000.

In addition, the authentication server 3000, while receiving the request for issuance of the authentication information from the user terminal 100, may acquire information required to determine whether the user and/or the user terminal 1000 is a valid user and/or user terminal, and upon determination that the user and/or the user terminal 1000 is a valid user and/or user terminal, issue authentication information to the user terminal 1000.

Figure 2:
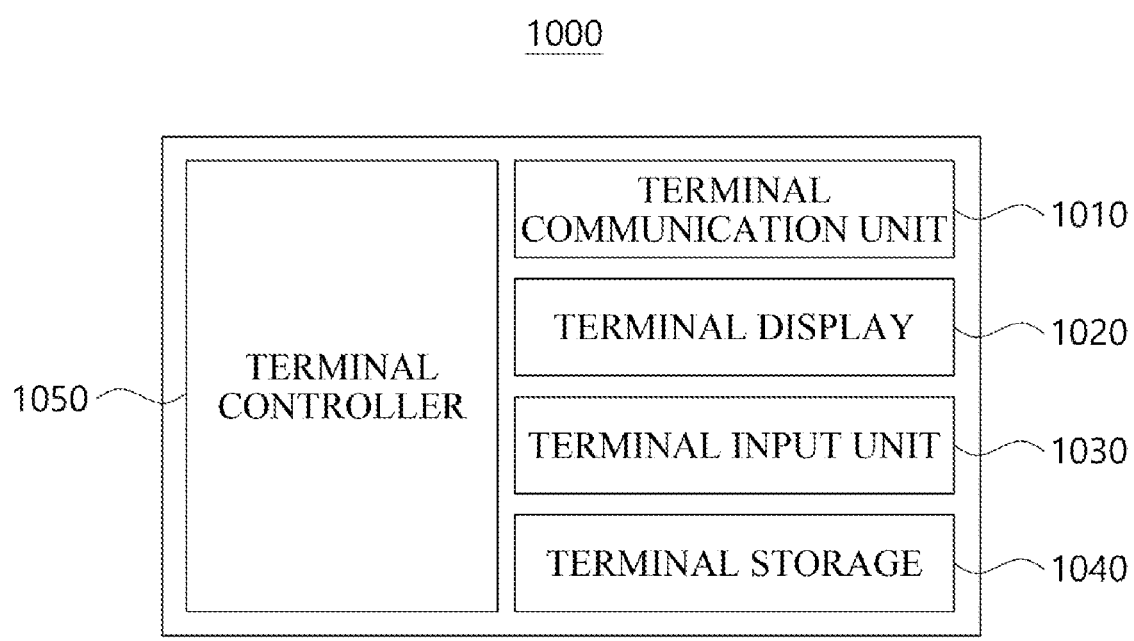
FIG. 2 is a block diagram illustrating a user terminal according to an embodiment.

FIG. 2 is a block diagram illustrating a user terminal according to an embodiment.

Referring to FIG. 2, the user terminal 1000 may include a terminal communication unit 1010, a terminal display 1020, a terminal input unit 1030, a terminal storage 1040, and a terminal controller 1050.

The terminal communication unit 1010 may connect the user terminal 1000 to an external electronic device. For example, the terminal communication unit 1010 may connect the user terminal 1000 to an external electronic device such as the access control device 2000 or the authentication server 3000. In addition, the terminal communication unit 1010 may be a communication module for supporting wired and/or wireless communication. For example, the terminal communication unit 1010 may acquire data from the access control device 2000 through a communication method that supports Bluetooth, ZigBee, Bluetooth low energy (BLE), or radio frequency identification (RFID).

The terminal display 1020 may output visual information.

When the terminal display 1020 is provided as a touch screen, the terminal display 1020 may serve as the terminal input unit 1030. In this case, depending on the selection, the terminal input unit 1030 may not be separately provided, and the terminal input unit 1030 for performing limited functions, such as of a volume control button, a power button, and a home button, may be provided.

The terminal input unit 1030 may acquire a signal corresponding to a user's input.

The terminal input unit 1030 may be implemented as, for example, a keyboard, a keypad, a button, a jog shuttle, or a wheel.

In addition, the user's input may be, for example, a push of a button, a touch, or a drag.

When the terminal display 1020 is implemented as a touch screen, the terminal display 1020 may serve as the terminal input unit 1030.

The terminal storage 1040 may store data.

The terminal storage 1040 may be implemented as, for example, a flash memory, a random-access memory (RAM), a read-only memory (ROM), a solid-state drive (SSD), a secure digital (SD) card, and an optical disk.

The terminal storage 1040 may store data required for the operation of the user terminal 1000.

The terminal controller 1050 may control the overall operation of the user terminal 1000. In addition, the terminal controller 1050 may measure an RSSI using a signal received from the outside. In addition, the terminal controller 1050 may acquire a corrected RSSI through a low-pass filter, a Schmitt trigger, or the like.

Figure 3:
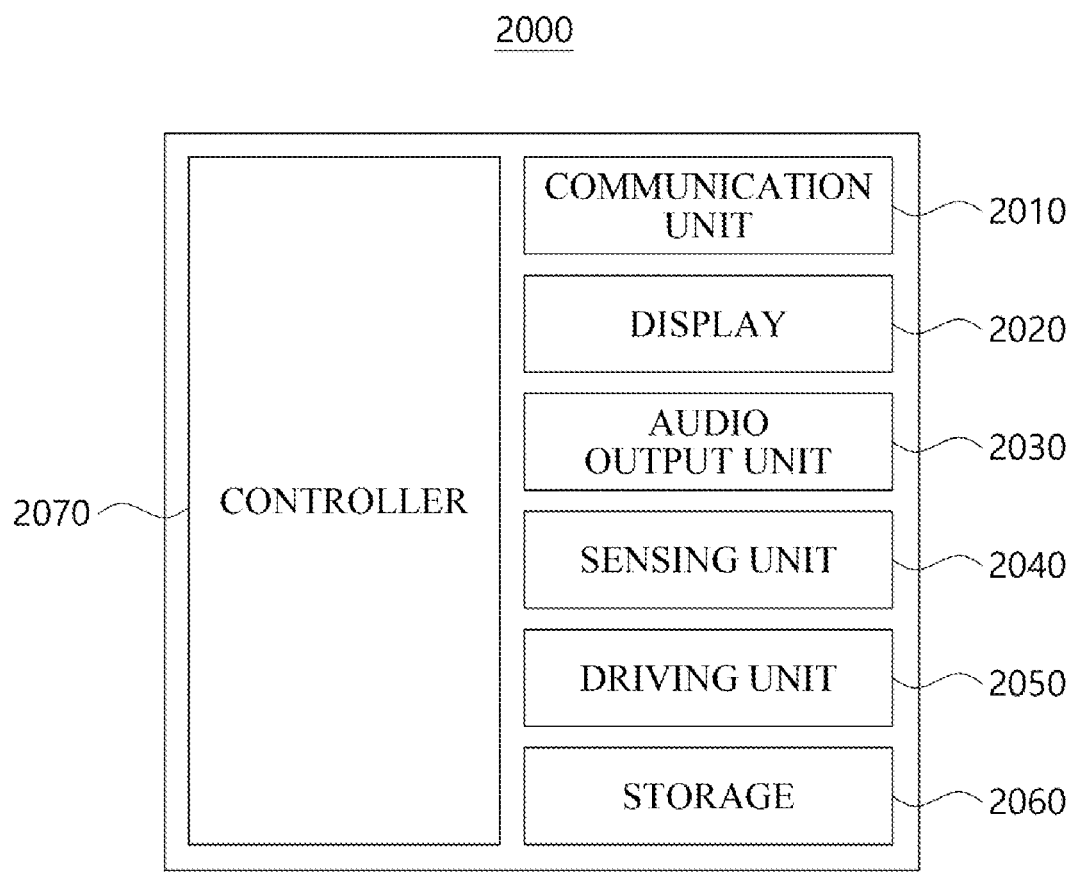
FIG. 3 is a block diagram illustrating an access control device according to an embodiment.

FIG. 3 is a block diagram illustrating an access control device according to an embodiment.

Referring to FIG. 3, the access control device 2000 includes a communication unit 2010, a display 2020, an audio output unit 2030, a sensing unit 2040, a driving unit 2050, a storage 2060, and a controller 2070.

The communication unit 2010 may be a communication module capable of acquiring data from the user terminal 1000.

For example, the communication unit 2010 may acquire data from the user terminal 1000 through a communication method that supports Bluetooth, ZigBee, BLE, or RFID.

The display 2020 may output visual information.

The display 2020 may output information that is to be visually provided to a user. When the display 2020 includes a touch panel, the display 2020 may operate as an input device based on a touch input.

The audio output unit 2030 may output information that is to be audibly provided to the user.

For example, the audio output unit 2030 may be a speaker or buzzer that outputs sound.

The sensing unit 2040 may acquire a signal related to an access control state. For example, the sensing unit 2040 may acquire a signal including information on whether a door is opened. For another example, the sensing unit 2040 may acquire a signal including information on whether a security system operates in a security area.

The sensing unit 2040 may acquire a signal related to an external environment required for the access control device 2000. For example, the sensing unit 2040 may acquire a signal related to the distance between a user and an object. For another example, the sensing unit 2040 may acquire a signal required for determining the position of a door-leaf.

The driving unit 2050 may provide power required to perform an access control operation. For example, the driving unit 2050 may provide power required for locking or unlocking of a door-leaf provided in a door. For another example, when a door is implemented as an automatic door, the driving unit 2050 may provide power required for opening or closing a door leaf.

The storage 2060 may store a program for performing a control operation of the controller 2070 and may store data received from the outside and data generated from the controller 2070.

The controller 2070 may control the overall operation of the access control device 2000.

Figure 4:
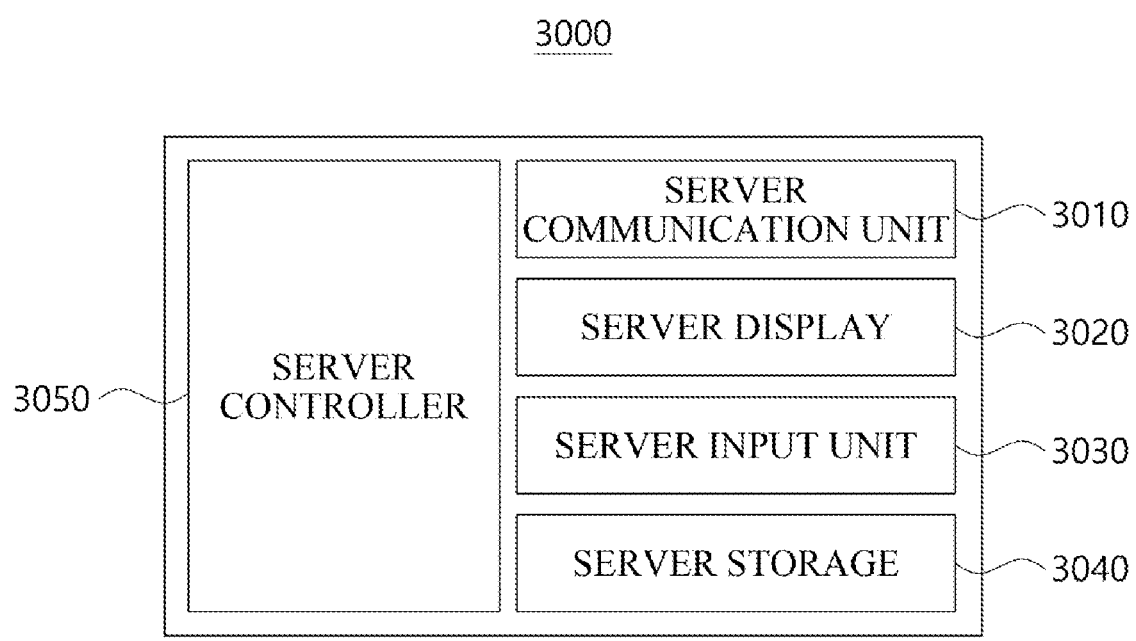
FIG. 4 is a block diagram illustrating an authentication server according to an embodiment.

FIG. 4 is a block diagram illustrating an authentication server according to an embodiment.

Referring to FIG. 4, the authentication server 3000 may include a server communication unit 3010, a server display 3020, a server input unit 3030, a server storage 3040, and a server controller 3050.

The server communication unit 3010 may connect the authentication server 3000 to an external electronic device. That is, the server communication unit 3010 may transmit and receive data to and from an external electronic device. In addition, the server communication unit 3010 may maintain or release a communication connection with the user terminal 1000 as required. In addition, the server communication unit 3010 may be provided to always maintain a connection with the user terminal 1000 according to an embodiment.

In addition, the server communication unit 3010 may be a communication module for supporting at least one of a wired communication method and a wireless communication method.

The server display 3020 may output visual information.

For example, the server display 3020 may be a liquid crystal display (LCD), an organic light emitting diode (OLED) display, an active matrix organic light emitting diode (AMOLED) display, or the like.

The server input unit 3030 may acquire an electrical signal corresponding to a user's input. For example, the server input unit 3030 may include a keypad, a keyboard, a switch, a button, and a touch screen.

The server storage 3040 may store data.

For example, the server storage 3040 may store data acquired from the user terminal 1000. For another example, the server storage 3040 may store a program required for the operation of the authentication server 3000.

The server controller 3050 may control the overall operation of the authentication server 3000.

The authentication server 3000 according to the present invention does not need to include all the above-described components and may be provided in a form excluding some components depending on the selection. For example, when the authentication server 3000 does not directly provide visual information, the authentication server 3000 may be provided in a form excluding the server display 3020. In addition, the authentication server 3000 may be provided in a form further including a configuration for performing additional functions and operations according to the selection.

Figure 5:
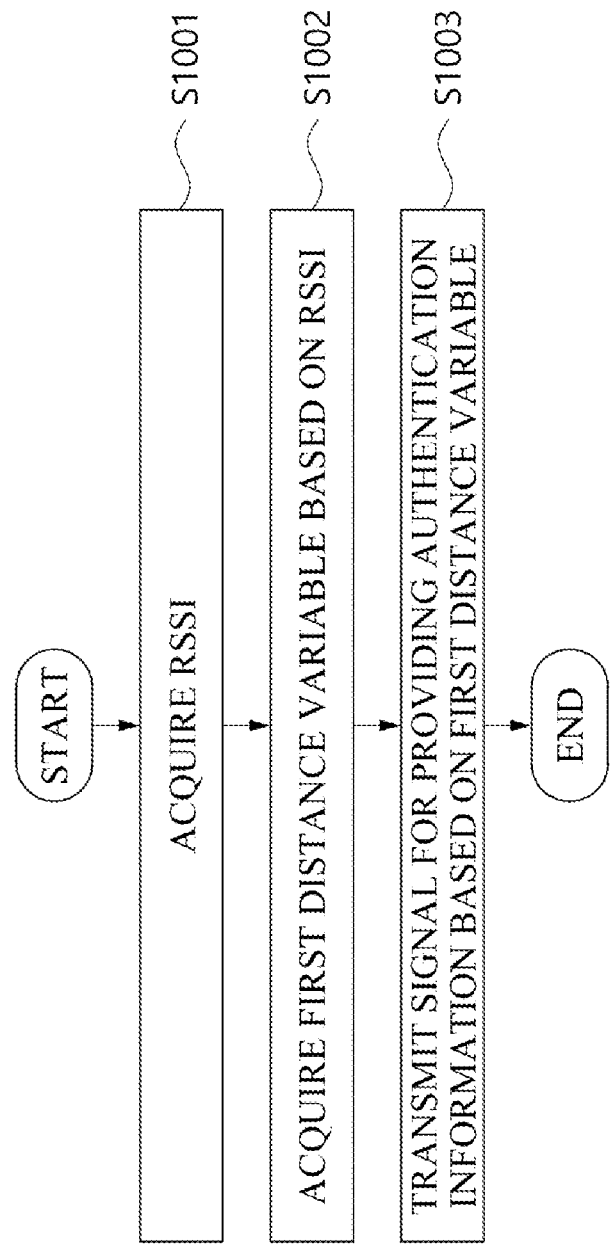
FIG. 5 is a flowchart showing an access control method based on a first distance variable acquired based on a received signal strength indicator (RSSI)

FIG. 5 is a flowchart showing an access control method based on a first distance variable acquired based on an RSSI.

Referring to FIG. 5, the access control method includes acquiring an RSSI S1001, acquiring a first distance variable based on the RSSI S1002, and transmitting a signal for providing authentication information based on the first distance variable S1003.

In the operation S1001 of acquiring the RSSI, the user terminal 1000 may acquire an RSSI for a signal received from the access control device 2000.

In addition, the user terminal 1000 may store an RSSI having a maximum value among RSSIs acquired for a predetermined time as a maximum RSSI MAX_RSSI.

In addition, the user terminal 1000 may update the value of the maximum RSSI MAX_RSSI. For example, when the maximum RSSI MAX_RSSI acquired by the user terminal 1000 at a first time point is −26 dBm and an RSSI acquired at the second time point after the first time point is −20 dBm, the user terminal 1000 may update the maximum RSSI MAX_RSSI to −20 dBm.

In one embodiment, the maximum RSSI MAX_RSSI may be used to acquire the first distance variable. Details thereof will be described below in operation S1002 of acquiring the first distance variable based on RSSI.

In the operation S1002 of acquiring the first distance variable based on RSSI, the user terminal 1000 may acquire the first distance variable related to the distance between the access control device 2000 and the user terminal 1000 based on the acquired RSSI.

In addition, the user terminal 1000 may acquire the first distance variable based on the RSSIs acquired for a predetermined time. The user terminal 1000 may acquire the first distance variable based on the acquired RSSI and the stored maximum RSSI MAX_RSSI.

The relationship between the RSSI, the maximum RSSI MAX_RSSI, and the first distance variable may be determined according to the following Equation 2.

$$\text{First distance variable} = 10^{\frac{(MAX\_RSSI+OFFSET-RSSI)}{(10+DEFAULT\_RSSI-MAX\_RSSI)}} \quad \text{[Equation 2]}$$

In this case, in Equation 2 above, 10+DEFAULT_RSSI−MAX_RSSI may be greater than zero. Hereinafter, the first distance variable according to Equation 2 will be described in more detail with reference to FIG. 6.

Figure 6:
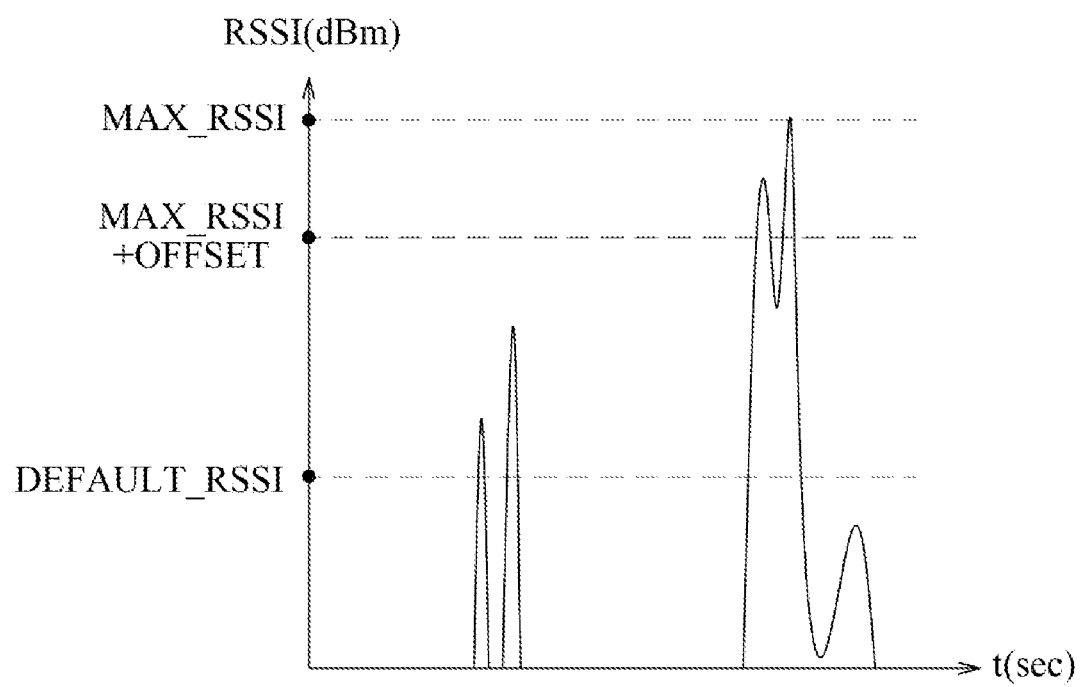
FIG. 6 is a graph showing RSSIs acquired from a user terminal.

FIG. 6 is a graph showing RSSIs acquired from a user terminal.

Referring to FIG. 6, the x-axis of the graph of FIG. 6 may represent time, and the y-axis may represent RSSI intensity.

In an embodiment, MAX_RSSI may refer to a maximum RSSI among RSSIs acquired by the user terminal 1000. As described above, the user terminal 1000 may update MAX_RSSI.

DEFAULT_RSSI may refer to an RSSI that is set as one reference such that a distance variable is acquired within a predetermined numerical range of the acquired RSSI. DEFAULT_RSSI may refer to a value previously stored before acquiring an RSSI of a signal received from the access control device 2000.

For example, as the distance between the user terminal 1000 and the access control device 2000 decreases, the magnitudes of the RSSI value acquired from the user terminal 1000 vary from −35 dBm to −30 dBm, −25 dBm, and −20 dBm, and for DEFAULT_RSSI of −30 dBm, the user terminal 1000 may start acquiring the distance variable from when the RSSI has a value of −30 dBm.

OFFSET may refer to a variable for improving the sensitivity of calculating the first distance variable. For example, when the acquired RSSI and the maximum RSSI MAX_RSSI are the same, MAX_RSSI-RSSI in the numerator of the exponent part in Equation 2 may become zero in the absence of OFFSET in Equation 2 expressing the first distance variable so that the first distance variable may become one, which is the maximum value. However, due to the presence of OFFSET, the first distance variable may become a number less than one. Accordingly, the sensitivity of calculating the first distance variable may be increased.

The user terminal 1000 may acquire information related to a change in the distance between the access control device 2000 and the user terminal 1000 through a distance variable acquired based on an RSSI that causes "MAX_RSSI+OFFSET" of the exponent part to be less than or equal to zero in Equation 2.

In one embodiment, the MAX_RSSI may be different between user terminals, and the OFFSET may be set to be the same between user terminals. Such a difference in MAX_RSSI occurs because RSSIs measured by different user terminals may be different even at the same distance. Accordingly, by using the difference between MAX_RSSI and a measured RSSI in the numerator of the exponent in Equation 2, a variation between RSSIs measured by different user terminals, which occurs even at the same distance, may be corrected.

In addition, the reason for setting OFFSET to be the same for each user terminal may be to equally set the sensitivity of calculating the distance variable for each user terminal.

For example, when OFFSET is 20, the sensitivity for the first distance variable may be provided with twenty steps, and when OFFSET is 8, the sensitivity for the first distance variable may be provided with eight steps. Accordingly, the higher the OFFSET, the higher the sensitivity of the first distance variable.

In addition, in Equation 2, the sensitivity of the access control device 2000 to a change in RSSI may be determined through {10+DEFAULT_RSSI−MAX_RSSI} corresponding to the denominator of the exponent part.

For example, a completed equation of the first distance variable for a first user terminal is expressed as $$\text{First distance variable} = 10^{\left(\frac{(C1-RSSI)}{6}\right)},$$

and a completed equation of the first distance variable for a second user terminal is expressed as $$\text{First distance variable} = 10^{\left(\frac{(C2-RSSI)}{10}\right)}$$

(here, C1 and C2 are MAX_RSSI+OFFSET)).

In this case, when C1−RSSI changes from 0 to −6, the first distance variable for the first user terminal may decrease from 1.00 to 0.10. In addition, when C2−RSSI changes from 0 to −6, the first distance variable for the second user terminal may decrease from 1.00 to 0.25.

In an embodiment, in the operation S1003 of transmitting a signal for providing authentication information based on the first distance variable, the user terminal 1000 may transmit a signal for providing authentication information to the access control device 2000 at a time point when the first distance variable becomes less than or equal to a predetermined reference value or within a predetermined time period including the time point when the first distance variable becomes less than or equal the predetermined reference value. For example, in the above-described example, while the predetermined reference value for the first distance variable is 0.18, a first user terminal, which has a first distance variable of 0.1, may transmit a signal for providing authentication information to the access control device 2000. On the other hand, a second user terminal, which has a first distance variable of 0.25, may not transmit a signal for providing authentication information to the access control device 2000.

In addition, in an embodiment, the access control device 2000 may perform an access control operation using the signal for providing authentication information acquired from the user terminal 1000. Here, the access control operation may refer to an operation of controlling access of the user terminal 1000 to a predetermined area using authentication information for the user terminal 1000.

In addition, the access control device 2000 may compare the authentication information related to the user terminal with authentication information stored in advance to acquire a comparison result, and based on the comparison result, control access of the user terminal 1000 to a predetermined area. For example, the access control device 2000 may control to open a door for entering a predetermined area based on the comparison result. For another example, the access control device 2000 may control to operate a security system in a security area based on the comparison result.

In addition, in an embodiment, the access control device 2000 may transmit a signal for requesting provision of authentication information to the user terminal 1000. As an example, the access control device 200 may receive a signal for providing authentication information from the user terminal 1000 and, in response to receiving the signal for providing the authentication information, transmit a signal for requesting provision of authentication information to the user terminal 1000. In this case, the user terminal 1000 may transmit a signal including authentication information to the access control device 2000.

For another example, the access control device 2000 may broadcast a signal for requesting provision of authentication information or may transmit a signal for requesting provision of authentication information to the user terminal 1000. In this case, the user terminal 1000 may provide a signal for providing authentication information to the access control device 2000 according to the signal for requesting the provision of authentication information. In addition, according to embodiments, the signal for providing authentication information may or may not contain authentication information. When the signal for providing authentication information does not contain authentication information, the user terminal 1000 may additionally transmit a signal containing authentication information to the access control device 2000 after the transmission of the signal for providing authentication information to the access control device 2000.

The user terminal 1000 may provide authentication information to the authentication server 3000, and the access control device 2000 may acquire the authentication information from the authentication server 3000. For example, the access control device 2000 may acquire a signal for providing authentication information from the user terminal 1000 and then request authentication information from the authentication server 3000 to acquire the authentication information from the authentication server 3000.

In addition, the predetermined reference value may be stored in advance in the user terminal 1000. In addition, the predetermined reference value stored in advance in the user terminal 1000 may be changed at the request of the user of the user terminal 1000 or the access control device 2000.

In an embodiment, an RSSI acquired from the user terminal 1000 may include noise. When the user terminal 1000 acquires a distance variable based on the RSSI including such noise and removes the noise from the acquired distance variable using a filter, the distance variable in which the noise has been removed may more accurately reflect information about the distance between the access control device 2000 and the user terminal 1000.

Figure 7:
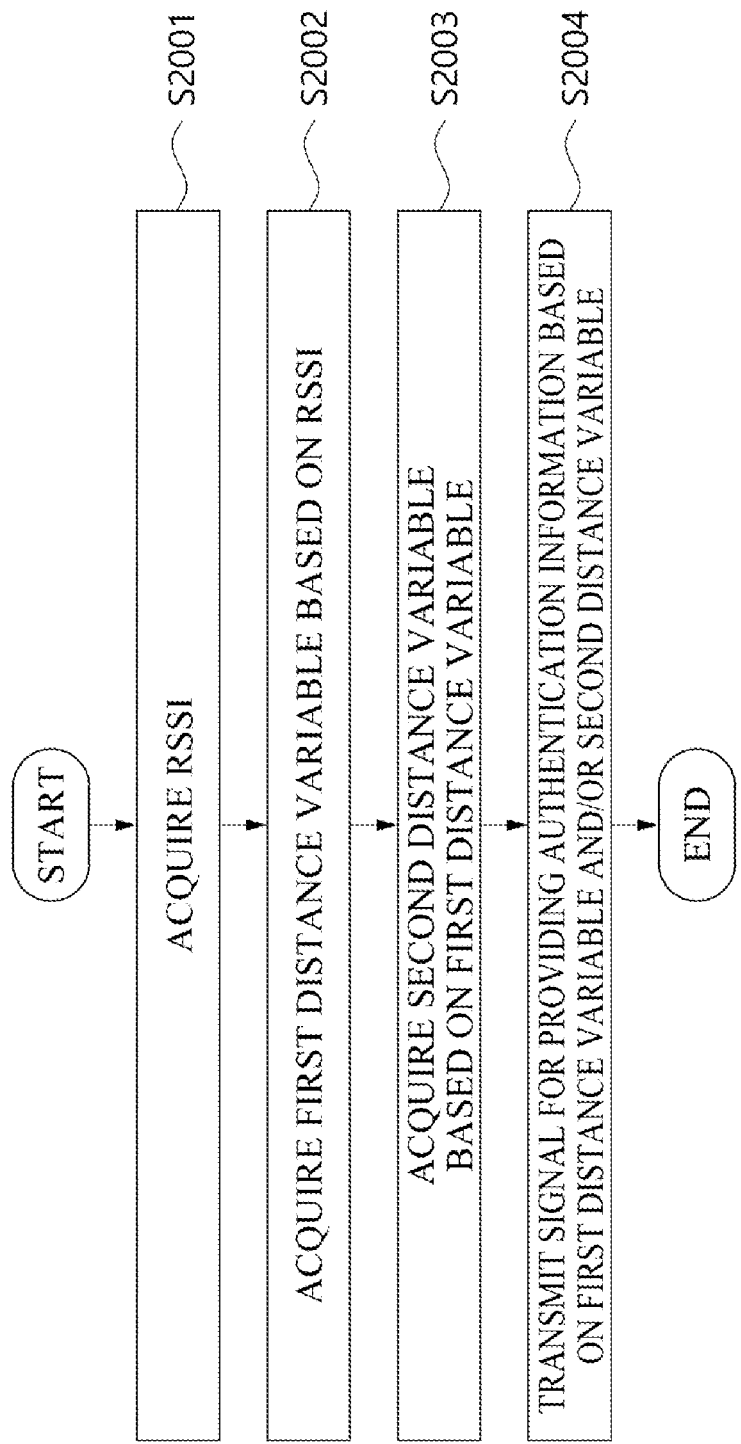
FIG. 7 is a flowchart showing operations of an access control method based on a second distance variable acquired based on a first distance variable.

In the description of FIG. 7, a method of acquiring a second distance variable in which noise has been removed from the above-described first distance variable and transmitting a signal for acquiring authentication information related to a user terminal based on the acquired second distance variable will be described.

FIG. 7 is a flowchart showing operations of an access control method based on a second distance variable acquired based on a first distance variable.

Referring to FIG. 7, the access control method includes acquiring an RSSI S2001, acquiring a first distance variable based on the RSSI S2002, acquiring a second distance variable based on the first distance variable S2003, and transmitting a signal for providing authentication information based on the first distance variable and/or the second distance variable S2004.

However, the description of the operation S1001 of acquiring the RSSI may equally apply to the operation S2001 of acquiring the RSSI shown in FIG. 2. Further, the description of the operation S1002 of acquiring the first distance variable based on the RSSI may equally apply to the operation S2002 of acquiring the first distance variable based on the RSSI. Accordingly, detailed descriptions of the operation S2001 of acquiring the RSSI and the operation S2002 of acquiring the first distance variable based on the RSSI will be omitted.

In the operation S2003 of acquiring the second distance variable based on the first distance variable, the user terminal 1000 may acquire a second distance variable based on an acquired first distance variable.

The user terminal 1000 may acquire the second distance variable using a moving average filter for the first distance variable based on RSSIs acquired for a predetermined time period. As an example, for ten RSSIs acquired for 1000 msec, a second distance variable may be acquired using a moving average filter having a window size of 1000/5=200 msec. As another example, for ten RSSIs acquired for 1000 msec, a second distance variable may be acquired using a moving average filter having a window size of 1000/8=125 msec. In this case, the window size of the moving average filter may affect the above-described sensitivity of the access control device 2000. In addition, a recursive moving average filter may be used as the moving average filter.

The moving average filter described in the present specification may include all types of moving average filters and recursive moving average filters for removing noise of a signal and may not be limited to the moving average filter in the type and values described above.

The user terminal 1000 may apply a moving average filter to a first distance variable obtained based on RSSIs acquired during a predetermined time period to acquire the average rate of change (for example, the slope or rate of change of a graph per unit time) of the first distance variable during the predetermined time period.

Here, the sign of the average rate of change of the first distance variable may have a positive correlation with the distance between the access control device 2000 and the user terminal 1000. For example, when the average rate of change of the first distance variable is a negative value, the distance between the access control device 2000 and the user terminal 1000 may be considered to decrease.

Here, the size of the average rate of change of the first distance variable may have a positive correlation with the rate of change of the distance between the access control device 2000 and the user terminal 1000. For example, when the absolute value of the average rate of change of the first distance variable increases, the rate of decrease of the distance between the access control device 2000 and the user terminal 1000 may be considered to increase.

The user terminal 1000 may apply a moving average filter to a first distance variable obtained based on RSSIs acquired during a first time period to acquire the first average slope of the first distance variable during the first time period. In addition, the user terminal 1000 may apply a moving average filter to the first distance variable obtained based on RSSIs acquired during a second time period after the first time period to acquire the second average slope of the first distance variable during the first time period. The user terminal 1000 may acquire a second distance variable based on the first average slope, the second average slope, and the first distance variable that are acquired.

In one embodiment, the user terminal 1000 may acquire the second distance variable for a time point after the second time period based on the acquired first average slope, second average slope, and first distance variable according to Equation 3 below.

second distance variable=first distance variable+
{(first average slope+second average slope)/2}   [Equation3]

In the operation S2004 of transmitting a signal for providing authentication information based on the first distance variable and/or the second distance variable, the user terminal 1000 may perform an operation of providing authentication information within a predetermined time period including a time point when the first distance variable becomes less than or equal to a predetermined fixed reference value or within a predetermined time period including a time point when the second distance variable becomes less than or equal to a variable reference value.

Here, the time point when the second distance variable becomes less than or equal to the variable reference value refers to a time point at which the second distance variable having had a value greater than or equal to the variable reference value at a first time point is switched to have a value less than or equal to the variable reference value at a second time point after the first time point.

In addition, the variable reference value may be stored in advance in the access control device 2000.

In addition, the variable reference value stored in advance in the user terminal 1000 may be changed. The variable reference value stored in advance in the access control device 2000 may be changed based on the first average slope and the second average slope acquired from the first distance variable.

For example, the user terminal 1000 may acquire a first average slope of the first distance variable for a first time period. In addition, the user terminal 1000 may acquire a second average slope of the first distance variable for a second time period after the first time period. The user terminal 1000 may change the variable reference value for a third time period after the second time period based on the first average slope and the second average slope. At least portions of the first time period and the second time period may overlap each other. In addition, at least portions of the second time period and the third time period may overlap each other.

For a more specific example, when the average value of the first average slope and the second average slope is negative, the user terminal 1000 may increase the variable reference value from 0.15 to 0.2 based on the first average slope and the second average slope. Accordingly, the user terminal 1000 may perform an operation of providing authentication information even when approaching from a position that is more distant from the access control device 2000.

Figure 8:
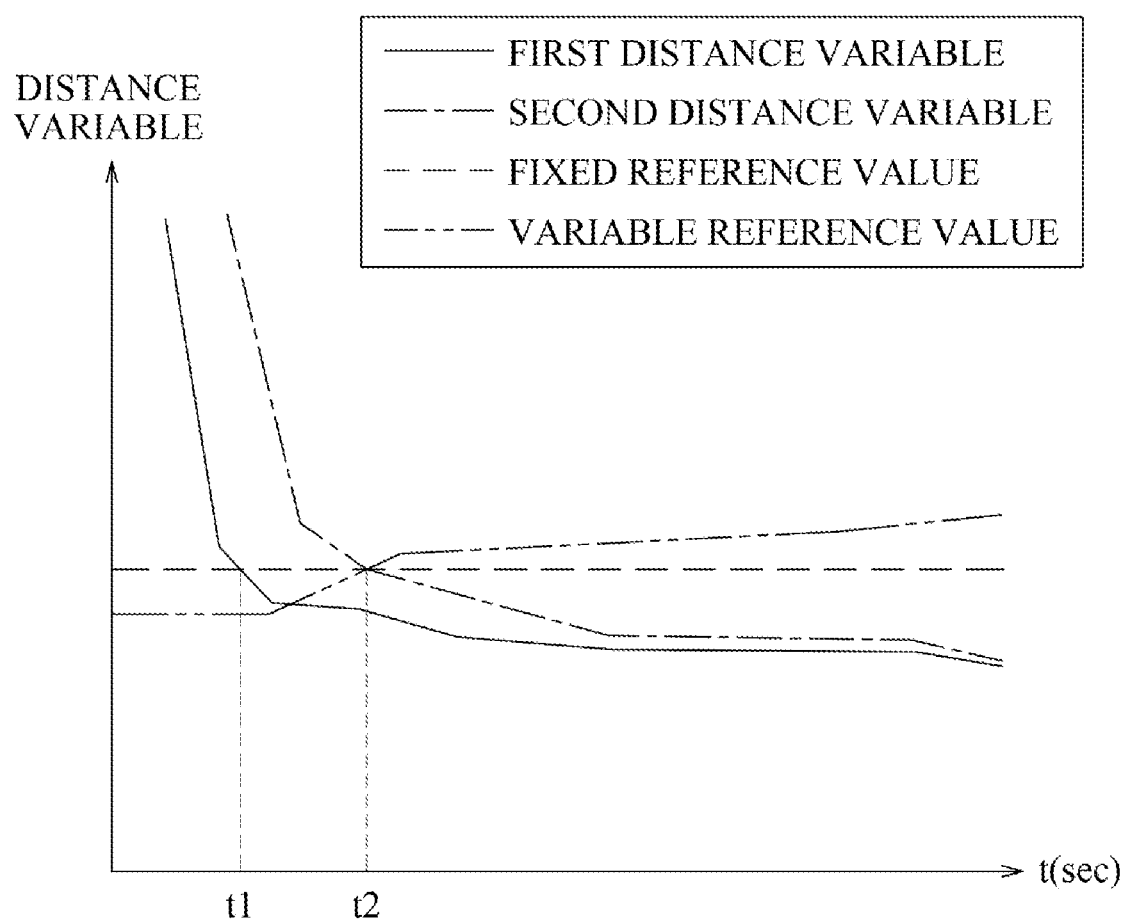
FIGS. 8 and 9 are graphs showing a case in which an acquired first distance variable becomes less than or equal to a fixed reference value or an acquired second distance variable becomes less than or equal to a variable reference value.
Figure 9:
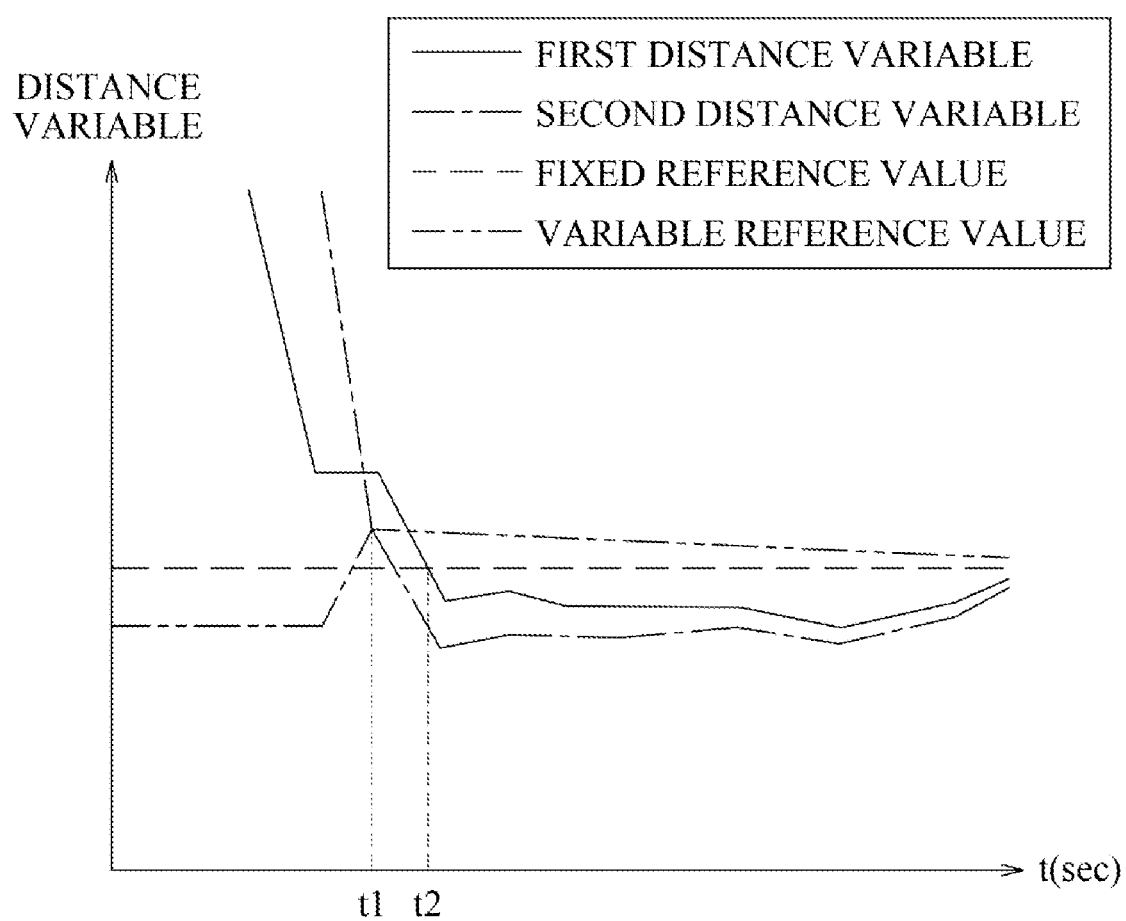

FIGS. 8 and 9 are graphs showing a case in which an acquired first distance variable is less than or equal to a fixed reference value or an acquired second distance variable is less than or equal to a variable reference value. In the graphs of FIGS. 8 and 9, the x-axis represents time, and the y-axis represents the size of a distance variable.

Referring to FIG. 8, with respect to the same access control device 2000, the first distance variable acquired by the user terminal 1000 becomes less than or equal to the fixed reference value at a time point of t1, and the second distance variable acquired by the user terminal 1000 becomes less than or equal to the variable reference value at a time point t2 that is after t1. The access control device 2000 may perform an operation of providing authentication information when the time point t is t1.

Referring to FIG. 9, with respect to the same access control device, the second distance variable acquired by the user terminal 1000 becomes less than or equal to the variable reference value at a time point of t1, and the first distance variable acquired by the user terminal 1000 becomes less than or equal to the fixed reference value at a time point t2 after t1. The user terminal may perform an operation of providing authentication information when the time point t is t2.

The user terminal 1000 may transmit a signal for providing authentication information to the access control device 2000 when the first distance variable becomes less than or equal to a predetermined fixed reference value or the second distance variable becomes less than or equal to a variable reference value. When authentication information is contained in the signal for providing authentication information, the access control device 2000 may perform access authentication on the user terminal 1000 based on the authentication information.

In addition, when the signal for providing authentication information does not contain authentication information, the access control device 2000 may transmit a signal for requesting provision of authentication information to the user terminal 1000 in response to receiving the signal for providing authentication information. In this case, the user terminal 1000 may transmit a signal including authentication information to the access control device 2000, and the access control device 2000 may perform access authentication on the user terminal 1000 based on the authentication information. In addition, the access control device 2000 may acquire the authentication information from the authentication server 3000 by requesting the authentication information from the authentication server 3000.

Figure 10:
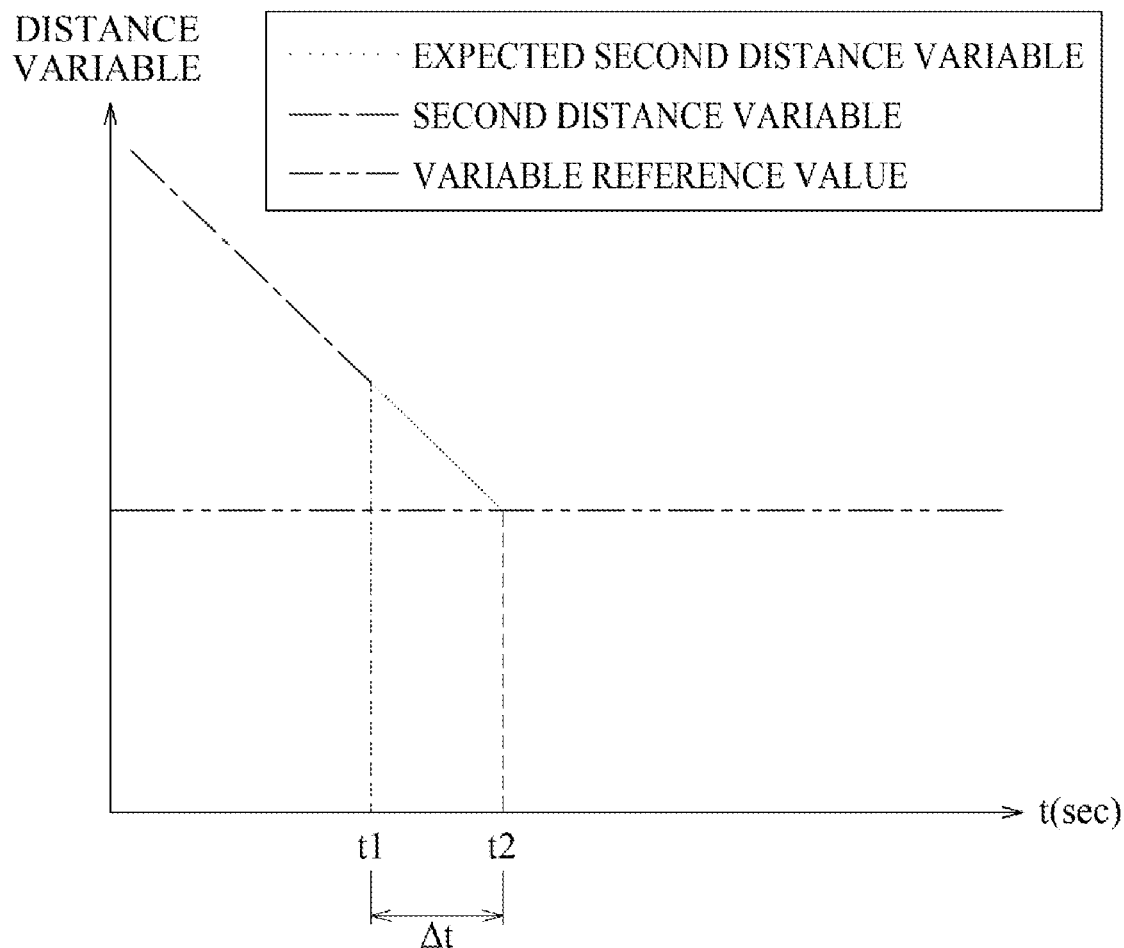
FIG. 10 is a graph for describing an expected time for a second distance variable.

FIG. 10 is a graph for describing an expected time of a second distance variable.

Referring to FIG. 10, in the graph shown in FIG. 10, the x-axis represents time, and the y-axis represents the size of a distance variable. t1 may represent the current time point.

In an embodiment, the user terminal 1000 may acquire the second distance variable using Equation 3 described above. Referring to the graph of FIG. 10, the second distance variable is still greater than the variable reference value at a time t1 indicating the current time point so that the user terminal 1000 may not perform an operation of providing authentication information at a time t1. However, when considering the second distance variable, the user terminal 1000 may exhibit a tendency to approach the access control device 2000. In one embodiment, when the user terminal 1000 performs an operation of authentication at the current time point when it is expected that the distance between the user terminal 1000 and the access control device 2000 becomes less than a predetermined distance within a predetermined time while having a tendency to approach the access control device 2000, the authentication speed of the access control device 2000 for the user terminal 1000 may be improved.

Accordingly, in an embodiment, in a case in which the second distance variable is greater than or equal to the variable reference value, when the user terminal 1000 exhibits a tendency to approach the access control device 2000, and a time difference between an expected time when the second distance variable reaches the variable reference value and the current time point is less than a predetermined time value, the user terminal 1000 may perform an operation of providing authentication information at the current time point.

In more detail, the user terminal 1000 may calculate an expected second distance variable for a time after the current time point t1 by using the second distance variable calculated up to the current time point t1. For example, the user terminal 1000 may acquire the slopes of the second distance variable up to the current time point t1 and acquire the expected second distance variable using the slopes of the second distance variable. In addition, the user terminal 1000 may acquire a time point t2 which is a time point when the size of the expected second distance variable reaches the variable reference value. In addition, the user terminal 1000 may acquire a time difference Δt between the time point t1 and the time point t2 and determine whether the time difference Δt is less than or equal to a predetermined time value. In this case, when the time difference Δt is less than or equal to the predetermined time value, the user terminal 1000 may perform an operation of providing authentication information even when the second distance variable at the current time point t1 is greater than the variable reference value. In this case, the access control device 2000 may acquire authentication information from the user terminal 1000 at an earlier time, thereby performing authentication on the user terminal 1000 more rapidly.

In addition, the above-described embodiment is not limited to the second distance variable and the variable boundary line and may equally apply to the first distance variable and the fixed boundary line without change. That is, even when the first distance variable is greater than the fixed boundary line at the current time point, the user terminal 1000 may acquire an expected first distance variable at a time point after the current time point based on the slope of the first distance variable and acquire a time point at which the expected first distance variable reaches the fixed boundary line. Thereafter, when the time difference between the time when the expected first distance variable reaches the fixed boundary line and the current time point is less than a predetermined time value, the user terminal 1000 may perform an operation of providing authentication information at the current time point.

Figure 11:
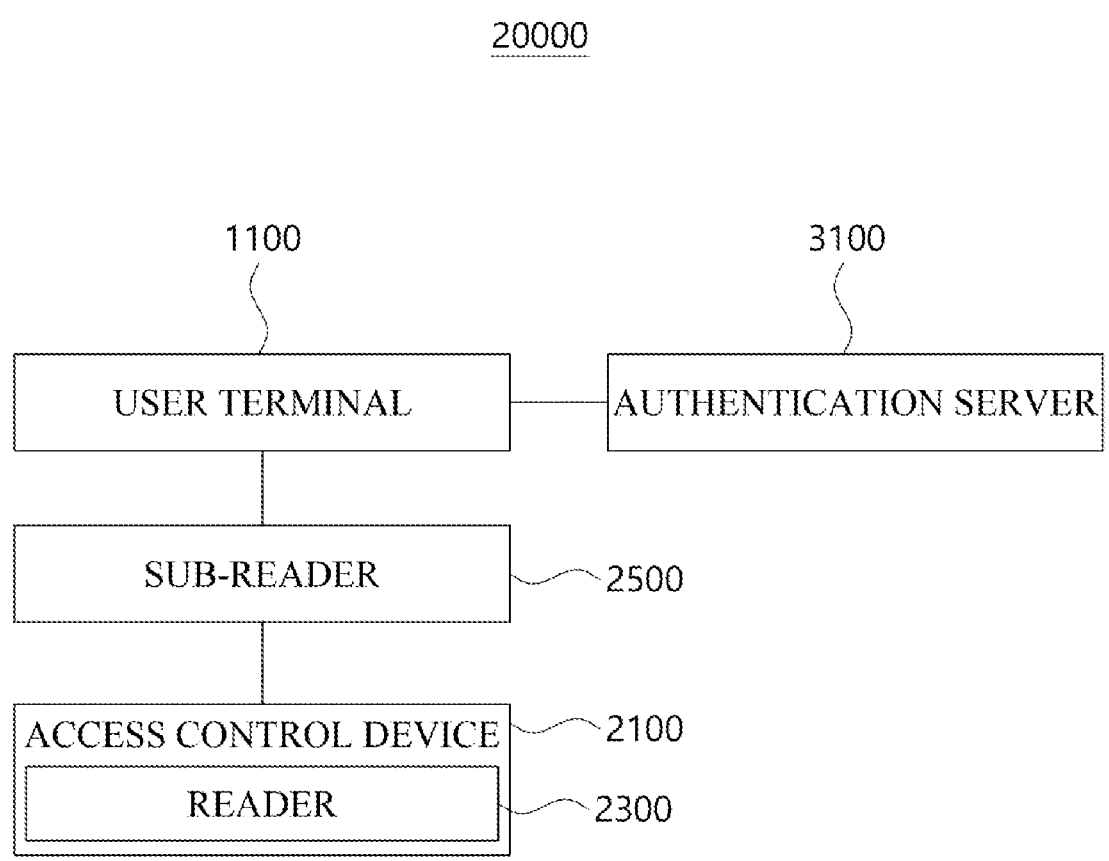
FIG. 11 is a diagram illustrating an access control system according to another embodiment.

FIG. 11 is a diagram illustrating an access control system according to another embodiment.

Referring to FIG. 11, an access control system 20000 according to another embodiment of the present invention may include a user terminal 1100, an access control device 2100, and an authentication server 3100. The access control device 2100 may include a reader 2300 and a sub-reader 2500.

Since the block diagram of the user terminal 1100 may be the same as the block diagram of the user terminal 1000 shown in FIG. 2 described above, detailed descriptions thereof will be omitted.

Since the block diagram of the access control device 2100 may be the same as the block diagram of the access control device 2000 shown in FIG. 3 described above, detailed descriptions thereof will be omitted.

In one embodiment, the reader 2300 may communicate with the access control device 2100 in a communication method supported by the access control device 2100. The reader 2300 may be connected to a controller 2070 of the access control device 2000. For example, the reader 2300 may detect a sensor of a sensing unit 2040 through the controller 2070. In addition, for example, the reader 2300 may control driving of a driving unit 2050 through the controller 2070.

In another embodiment, the reader 2300 may refer to the same device as the access control device 2100.

In addition, the reader 2300 may be connected to the sub-reader 2500 through a communication method supported by the reader 2300 or the access control device 2100.

When the communication method supported by the user terminal 1100 and the communication method supported by the reader 2300 are different from each other, the sub-reader 2500 may serve as an intermediate medium that aids in the connection of the user terminal 1100 and the reader 2300 based on both the communication method supported by the user terminal 1100 and the communication method supported by the reader 2300.

The sub-reader 2500 may communicate with the user terminal 1100 in the communication method supported by the user terminal 1100.

The sub-reader 2500 may communicate with the reader 2300 in the communication method supported by the reader 2300. In addition, the sub-reader 2500 may communicate with the access control device 2100 in the communication method supported by the reader 2300.

In addition, a connection between the user terminal 1100 and the access control device 2100 may be implemented through a connection between the user terminal 1100 and the sub-reader 2500.

The sub-reader 2500 may be a configuration for adding a communication method other than the communication method supported by the reader 2300 provided on the access control device 2100 installed in advance.

In addition, the sub-reader 2500 may be connected to the reader 2300.

For example, the sub-reader 2500 may be communicatively connected to the reader 2300 to transmit and/or receive data to/from the reader 2300.

However, in the example of FIG. 11, the sub-reader 2500 is illustrated as a device separated from the access control device 2100, but the present invention is not limited thereto, and the sub-reader 2500 may be included in the access control device 2100. In addition, the above descriptions made on the access control devices 2000 and 2100 may apply to the sub-reader 2500. For example, the configuration of the access control device 2000 described in FIGS. 1 to 11 may be included in the sub-reader 2500, or the operations of the access control device 2000 may be performed by the sub-reader 2500. In addition, the configuration of the sub-reader 2500 may also be included in the access control device 2000, or operations of the sub-reader 2500 may also be performed by the access control device 2000.

According to an embodiment, the authentication server 3100 may be connected to the user terminal 1100. In addition, the authentication server 3100 may be connected to the sub-reader 2500. In addition, although reference numeral 3100 denotes the authentication server 3100 in FIG. 1, the present invention is not limited thereto, and reference numeral 3100 may be understood as a server that communicates with at least one of a user terminal and a reader.

The authentication server 3100 may provide authentication information that is transmitted from the user terminal 1100 to request the access control device 2100 to perform an access control operation.

Here, the authentication may refer to confirming that the user of the user terminal 1100 is a valid (or authorized) user and/or that the user terminal 1100 is a valid (or authorized) user terminal 1100. In addition, the present invention is not limited thereto, and the authentication may refer to checking whether the user terminal 1100 and the sub-reader 2500 may communicate with each other. For example, the authentication server 3000 may periodically or non-periodically (for example, whenever receiving a request from various devices including the sub-reader 2500), provide encryption information (e.g., an encryption key) to the user terminal 1100 and/or the sub-reader 2500 as authentication information. In this case, the user terminal 1100 and the sub-reader 2500 may perform encryption based on the encryption information (or encryption information corresponding or related to the encryption information provided from the authentication server 3000) provided from the authentication server 3000 to generate data, and transmit and receive the generated data between one other. Each of the user terminal 1100 and the sub-reader 2500 may decrypt the data received from the counterpart thereof using the encryption information (or encryption information corresponding or related to the encryption information provided from the authentication server 3000) provided from the authentication server 3000, and when the decryption is normally performed, confirm that authentication between the user terminal 1100 and the sub-reader 2500 has been normally performed. The present invention is not limited thereto, and the authentication may be interpreted with various meanings for mutual identification.

In addition, the user terminal 1100 may provide the sub-reader 2500 with authentication information that is transmitted to request execution of an access control operation.

The authentication server 3100 may receive a request for issuance of authentication information to the user terminal 1100.

In addition, the authentication server 3100 may acquire information required for determining whether the user and/or the user terminal 1100 is a valid user and/or user terminal 1100 while receiving the request for issuance of the authentication information from the user terminal 1100, and upon determination that the user and/or the user terminal 1100 is a valid user and/or user terminal 1100, issue authentication information to the user terminal 1100.

As an embodiment, the sub-reader 2500 may acquire first request information from the user terminal 1100.

The sub-reader 2500 may acquire first request information from the user terminal 1100 in a first communication method. In this case, the sub-reader 2500 may perform authentication on the first request information or information related to the first request information. For example, the sub-reader 2500 may acquire information for authenticating the first request information or the information related to the first request information from the authentication server 3100. For example, the sub-reader 2500 may acquire the information for authentication from the authentication server 3100 once, periodically, or non-periodically. However, the present invention is not limited thereto, and the information for authentication may be stored in advance in the sub-reader 2500.

The sub-reader 2500 may perform authentication on the first request information or the information related to the first request information based on the information for authentication. For example, the sub-reader 2500 may determine whether the user of the user terminal 1100 is a user who is authorized to provide information to the reader 2300 based on the information for authentication. In this case, the information for authentication may include information for determining whether the user of the user terminal 1100 is a user who is authorized to provide information to the reader 2300. In addition, as another example, the first request information or the information related to the first request information may be encrypted using previously stored encryption information in the user terminal 1100. In this case, the previously stored encryption information may be provided from the authentication server 3100 or may be encryption information corresponding to or related to encryption information provided from the authentication server 3100. The sub-reader 2500 may acquire the encryption information provided from the authentication server 3100 or the encryption information corresponding to or related to the encryption information provided from the authentication server 3100 from the authentication server 3100. The sub-reader 2500 may perform decryption on the first request information or the information related to the first request information using the encryption information corresponding to or related to the encryption information provided from the authentication server 3100 and, when the decryption is normally performed, confirm that authentication has been normally performed.

According to another embodiment of the present invention, an operation of acquiring second request information may be performed.

The sub-reader 2500 may acquire the second request information in a second data format for a second communication method based on the first request information acquired in a first data format for the first communication method.

In addition, according to some embodiments of the present invention, the first request information and the second request information may have different data formats but may have the same detailed information.

In this case, according to an embodiment, the sub-reader 2500 may acquire the second request information when authentication for the first request information or the information related to the first request information is normally performed.

According to another embodiment of the present invention, an operation of transmitting the second request information may be performed. The sub-reader 2500 may transmit the second request information.

The sub-reader 2500 may provide the reader 2300 with the second request information through a reader second communication unit 2120.

The reader 2300, upon acquisition of the second request information from the sub-reader 2500 according to the provision of the second request information from the sub-reader 2500 through the reader 2300, may determine whether to open or close a door based on the second request information and may open or close the door based on the determination result.

Figure 12:
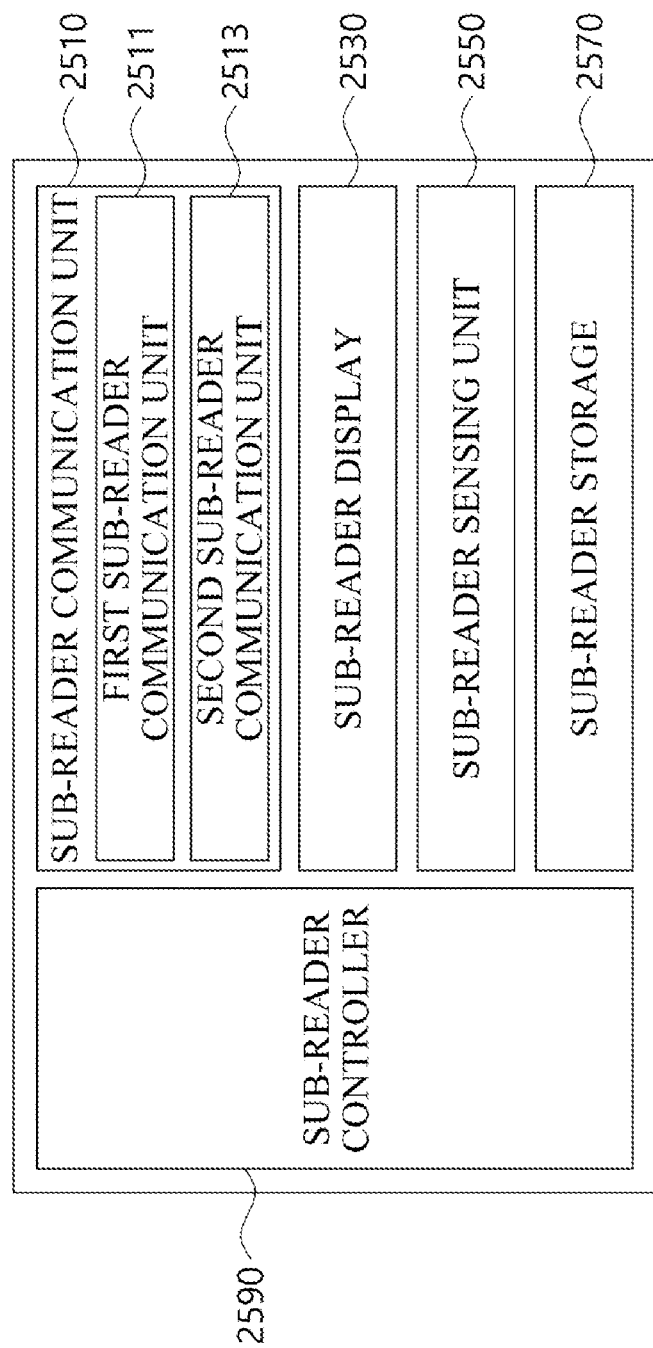
FIG. 12 is a block diagram illustrating a sub-reader according to an embodiment.

FIG. 12 is a block diagram illustrating a sub-reader according to an embodiment.

Referring to FIG. 12, a sub-reader 2500 includes a sub-reader communication unit 2510, a sub-reader display 2530, a sub-reader sensing unit 2550, a sub-reader storage 2570, and a sub-reader controller 2590.

The sub-reader communication unit 2510 may include a first sub-reader communication unit 2511 and a second sub-reader communication unit 2513.

The sub-reader communication unit 2510 may be connected to the user terminal 1100 and the access control device 2100.

For example, the sub-reader communication unit 2510 may be connected to the terminal communication unit 1010 of the user terminal 1100 at a time of connection to the user terminal 1100.

In addition, for example, the sub-reader communication unit 2510 may be connected to the reader 2300 included in the access control device 2100 at a time of connection to the access control device 2100.

In addition, the sub-reader communication unit 2510 may provide at least one communication method that is not supported by the reader 2300.

The sub-reader communication unit 2510 may include a first sub-reader communication unit 2511 connected to the user terminal 1100 and a second sub-reader communication unit 2513 connected to the reader 2300.

According to an embodiment, the first sub-reader communication unit 2511 may acquire data from the user terminal 1100, and the second sub-reader communication unit 2513 may provide data to the reader 2300.

In addition, according to an embodiment, a communication method in which the first sub-reader communication unit 2511 is connected to the user terminal 1100 and a communication method in which the second sub-reader communication unit 2513 is connected to the reader 2300 may be different from each other.

For example, the first sub-reader communication unit 2511 may be connected to the user terminal 1100 through a Bluetooth communication method, and the second sub-reader communication unit 2513 may be connected to the reader 2300 through a magnetic communication method.

In addition, according to an embodiment, the first sub-reader communication unit 2511 may support at least one communication method that is different from a communication method supported by the second sub-reader communication unit 2513.

For example, the first sub-reader communication unit 2511 may be connected to the user terminal 1100 through a Bluetooth communication method to acquire data, and the second sub-reader communication unit 2513 may provide the reader 2300 with data through a magnetic communication method.

The sub-reader display 2530 may output visual information.

The sub-reader display 2530 may output information that is to be visually provided to a user. When the sub-reader display 2530 includes a touch panel, the sub-reader display 2530 may operate as an input device based on a touch input.

The sub-reader sensing unit 2550 may acquire access control operation request information from the outside.

According to an embodiment, the sub-reader sensing unit 2550 may be provided as at least one of an image sensor, a biosignal acquisition sensor, and a barcode reader.

The image sensor may be a sensor module that acquires a signal corresponding to an external image.

The biosignal acquisition sensor may be a sensor module that acquires a signal related to biometric information, such as fingerprints, veins, irises, and faces.

The barcode reader may be a sensor module that acquires information from code data, such as a one-dimensional barcode and a two-dimensional barcode.

The one-dimensional barcode may be a linear barcode. In addition, the two-dimensional barcode may be a two-dimensional barcode, such as a quick response (QR) code, Aztec, MaxiCode, and Data Matrix.

The sub-reader storage 2570 may store a program for performing a control operation of the sub-reader controller 2590 and may store data received from the outside and data generated from the sub-reader controller 2590.

The sub-reader controller 2590 may control operations of several components included in the sub-reader 2500. In addition, the sub-reader controller 2590 may acquire signals from several components included in the sub-reader 2500.

The method according to the embodiments may be implemented in the form of program commands executable by various computer devices and may be recorded in a computer readable media. The computer readable media may be provided with program commands, data files, data structures, and the like alone or as a combination thereof. The program commands stored in the computer readable media may be specially designed and constructed for the purposes of the present invention or may be well-known and available to those having skill in the computer software arts. Examples of the computer readable storage medium include magnetic media, such as hard disks, floppy disks, and magnetic tape; optical media such as a compact disk (CD)-ROM, a digital video disk (DVD); magneto-optical media, such as floptical disks; and hardware devices specially constructed to store and execute program instructions such as a ROM, a RAM, and a flash memory.

The program command may include a high-level language code executable by a computer through an interpreter in addition to a machine language code made by a compiler. The described hardware devices may be configured to act as one or more software modules in order to perform the operations of the present invention, or vice versa. Examples of the program command may include a high-level language code executable by a computer through an interpreter in addition to a machine language code made by a compiler. The described hardware devices may be configured to act as one or more software modules in order to perform the operations of the present invention, or vice versa.

As is apparent from the above, according to an embodiment, an access control method capable of reducing variation of RSSIs between different terminals by acquiring information related to the distance between a user terminal and an access control device based on RSSIs acquired by the user terminal can be provided.

According to another embodiment, an access control method and an access control device that are provided to be robust against noise based on information related to the distance between the user terminal and the access control device acquired based on RSSIs can be provided.

The effects of the present application are not limited to the above-described effects, and effects not described may be clearly understood by those of ordinary skill in the art from the present specification and the accompanying drawings.

While some embodiments have been particularly shown and described, it will be understood by one of ordinary skill in the art that variations in form and detail may be made therein without departing from the sprit and scope of the claims. For example, appropriate results may be achieved although the described features or aspects within each device or method according to the embodiments are performed in an order different from the described methods, and/or the components such as a system, a structure, device, and a circuit are combined or coupled in a form different from that of the described methods, and/or are replaced or substituted with other components or equivalents thereof. Therefore, other implementations, other embodiments, and equivalents to the claims may be included in the scope of the claims that follow.

What is claimed is:

1. A method of controlling access of a user terminal, the method comprising:
acquiring received signal strength indicator (RSSI) value of a signal received from an access control device;
acquiring a first distance variable based on the RSSI value, wherein the first distance variable being related to a distance between the user terminal and the access control device; and
transmitting a signal for providing authentication information of the user terminal to the access control device within a first predetermined time period including a time point when the first distance variable becomes less than or equal to a predetermined fixed reference value such that the access control device determines whether to allow access of the user terminal based on the signal for providing authentication information;
wherein the first distance variable is acquired based on a corrected value of a maximum RSSI value acquired from the user terminal and a sensitivity determination value for determining a sensitivity of measuring the distance between the user terminal and the access control device.

2. The method of claim 1, wherein the first distance variable is acquired based on Equation below:

$$\text{first distance variable} = 10^{\{(A-RSSI)/B\}},$$ [Equation]

wherein the A represents the corrected value of the maximum RSSI value, wherein the B represents the sensitivity determination value for determining the sensitivity of measuring the distance between the user terminal and the access control device, and
wherein the RSSI represents the RSSI value of the signal received from the access control device.

3. The method of claim 1, further comprising:
acquiring a second distance variable based on the first distance variable,
wherein the signal for providing the authentication information of the user terminal is transmitted to the access control device such that the access control device determines whether to allow access of the user terminal within a second predetermined time period including a time point when the second distance variable becomes less than or equal to a variable reference value, and
wherein the variable reference value is determined based on a rate of change of the first distance variable per unit time.

4. The method of claim 2, wherein the A is determined as a value obtained by adding the maximum RSSI value to a preset offset value, the B is determined as a value obtained by subtracting the maximum RSSI value from a preset reference value, and the A is greater than the preset reference value and smaller than the maximum RSSI value.

5. The method of claim 3, wherein the second distance variable is a distance variable obtained based on a first average slope of the first distance variable obtained between a first time point and a second time point after the first time point and a second average slope of the first distance variable obtained between a third time point after the first time point and a fourth time point after the second time point.

6. The method of claim 1, wherein the variable reference value is a reference value obtained based on a first average slope of the first distance variable obtained between a first time point and a second time point after the first time point and a second average slope of the first distance variable obtained between a third time point after the first time point and a fourth time point after the second time point.

7. The method of claim 3, wherein the signal for providing the authentication information of the user terminal is transmitted to the access control device at the time point when the first distance variable becomes less than or equal to the fixed reference value or at the time point when the second distance variable becomes less than or equal to the variable reference value.

8. The method of claim 3, further comprising:
acquiring the second distance variable at a first time point that is earlier than the time point when the second distance variable becomes less than or equal to the variable reference value;
acquiring an expected second distance variable based on a slope of the second distance variable;
acquiring a second time point at which the expected second distance variable becomes less than or equal to the variable reference value; and
transmitting the signal for providing the authentication information of the user terminal to the access control device when a difference between the first time point and the second time point is less than a predetermined time interval.

9. A non-transitory computer-readable recording medium having a program recorded thereon for executing the method according to claim 1.

10. A user terminal comprising:
a communication unit configured to communicate with an access control device; and
a controller configured to:
control the communication unit;
acquire received signal strength indicator (RSSI) value of a signal received from an access control device via the communication unit; and
acquire a first distance variable based on the RSSI value, wherein the first distance variable is related to a distance between the user terminal and the access control device;
wherein the controller is configured to transmit a signal for providing authentication information of the user terminal to the access control device via the communication unit within a first predetermined time period including a time point when a first distance variable becomes less than or equal to a predetermined fixed reference value such that the access control device determines whether to allow access of the user terminal based on the signal for providing authentication information, and
wherein the first distance variable is acquired based on a corrected value of a maximum RSSI value acquired from the controller and a sensitivity determination value for determining a sensitivity of measuring the distance between the user terminal and the access control device.

11. The user terminal of claim 10, wherein the first distance variable is acquired based on Equation below:

first distance variable=$10^{\{(A-RSSI)/B\}}$, [Equation]

wherein the A represents the corrected value of the maximum RSSI value,
wherein the B represents the sensitivity determination value for determining the sensitivity of measuring the distance between the user terminal and the access control device, and
wherein the RSSI represents the RSSI value of the signal received from the access control device.

12. The user terminal of claim 10,
wherein the signal for providing the authentication information of the user terminal is transmitted to the access control device such that the access control device determines whether to allow access of the user terminal within a second predetermined time period including a time point when a second distance variable becomes less than or equal to a variable reference value, and
wherein the variable reference value is determined based on a rate of change of the first distance variable per unit time.

13. The user terminal of claim 11, wherein the A is determined as a value obtained by adding the maximum RSSI value to a preset offset value, the B is determined as a value obtained by subtracting the maximum RSSI value from a preset reference value, and the A is greater than the preset reference value and smaller than the maximum RSSI value.

14. The user terminal of claim 12, wherein the second distance variable is a distance variable obtained based on a first average slope of the first distance variable obtained between a first time point and a second time point after the first time point and a second average slope of the first distance variable obtained between a third time point after the first time point and a fourth time point after the second time point.

15. The user terminal of claim 10, wherein the variable reference value is a reference value obtained based on a first average slope of the first distance variable obtained between a first time point and a second time point after the first time point and a second average slope of the first distance variable obtained between a third time point after the first time point and a fourth time point after the second time point.

16. The user terminal of claim 12, wherein the controller controls the communication unit to transmit the signal for providing the authentication information of the user terminal to the access control device at the time point when the first distance variable becomes less than or equal to the fixed reference value or at the time point when the second distance variable becomes less than or equal to the variable reference value.

17. The user terminal of claim 12, wherein the controller is configured to:
acquire the second distance variable at a first time point that is earlier than the time point when the second distance variable becomes less than or equal to the variable reference value;
acquire an expected second distance variable based on a slope of the second distance variable;
acquire a second time point at which the expected second distance variable becomes less than or equal to the variable reference value; and
control the communication unit to transmit the signal for providing the authentication information of the user terminal to the access control device when a difference between the first time point and the second time point is less than a predetermined time interval.

* * * * *